United States Patent [19]
Hattori

[11] Patent Number: 5,654,804
[45] Date of Patent: Aug. 5, 1997

[54] PRINTER WITH PRINT IMAGE BUFFER EXPANDABLE DEPENDING ON LOAD IMPOSED WHEN COMPRESSED PRINT DATA IS DECODED

[75] Inventor: Yuji Hattori, Nagoya, Japan

[73] Assignee: Brother Kogyo Kabushiki Kaisha, Aichi-Ken, Japan

[21] Appl. No.: 410,148

[22] Filed: Mar. 24, 1995

[30] Foreign Application Priority Data

Mar. 24, 1994 [JP] Japan ................. 6-079438

[51] Int. Cl.⁶ ............................. H04N 1/00
[52] U.S. Cl. ............... 358/404; 358/444; 358/524; 395/427; 395/115; 371/21.2
[58] Field of Search .......................... 358/404, 442, 358/443, 444, 464, 426, 524; 371/5.1, 5.3, 21.5, 21.2, 40.1, 51.1, 21.1; 395/425, 427; 365/78, 184, 222; H04N 1/00

[56] References Cited

U.S. PATENT DOCUMENTS

| | | | |
|---|---|---|---|
| 3,849,592 | 11/1974 | Rosenheck | 178/6 |
| 4,591,967 | 5/1986 | Mattes et al. | 364/132 |
| 4,672,186 | 6/1987 | Van Tyne | 358/464 |
| 5,086,497 | 2/1992 | Horikawa et al. | 395/147 |
| 5,109,434 | 4/1992 | Shimizu et al. | 358/443 |
| 5,146,580 | 9/1992 | Naidu et al. | 395/425 |
| 5,163,122 | 11/1992 | Urabe | 395/109 |
| 5,526,128 | 6/1996 | Fujiki | 358/404 |
| 5,604,846 | 2/1997 | Kadota | 395/115 |

*Primary Examiner*—Edward L. Coles, Sr.
*Assistant Examiner*—Madeleine Av Nguyen
*Attorney, Agent, or Firm*—Kane, Dalsimer, Sullivan, Kurucz, Levy, Eisele and Richard, LLP

[57] ABSTRACT

A raster scanable number is representative of a number of raster scans that can be performed with dot image data stored in a print image buffer. A raster scanned number is representative of a number of raster scans actually performed by a print mechanism. The raster scanable number and the raster scanned number are compared to detect an occurrence of a print overrun. When the print overrun is detected, the data processing load imposed when compressed print data received from an external unit is decoded is calculated, and the storage capacity of the print image buffer is expanded to a degree determined according to the data processing load thus calculated. Therefore, even when the data processing load is large, such as during encoding processes, so that dot image data developing processes are delayed, the print image buffers will not be emptied of dot image data for printing and printer overrun can be prevented to a very high level.

14 Claims, 12 Drawing Sheets

PRINTER WITH PRINT IMAGE BUFFER EXPANDABLE DEPENDING ON LOAD IMPOSED WHEN COMPRESSED PRINT DATA IS DECODED

BACKGROUND OF THE INVENTION

1. Field of the Invention

The present invention relates to a printer with an expandable print buffer, and more particularly to a printer wherein a storage capacity of a print image buffer for storing bit image data is expanded to a degree depending on a data processing load imposed when compressed image data received from an external unit is decoded and developed into the bit image data.

2. Description of the Related Art

Laser printers are capable of high speed printing. Laser printers are usually connected to an external unit such as a host computer or a personal computer. The laser printer receives print data, such as text data and image data, from the external unit, develops the print data into bit image data (that is, into a form it can use for printing), and stores the bit image data in a print image buffer. Printing is performed by serially retrieving the bit image data from the print image buffer and raster scanning the bit image data on a dot-line basis. The image or text is printed on a print medium by a printing mechanism.

Print image buffers with sufficient fixed capacity to store a page's worth of bit image data must have a large capacity, such a one megabyte. A large capacity memory chip must be provided for such large print image buffers. Addition of such a large memory chip not only increases the cost of the laser printer but also takes up extra space within the laser printer. Many printers with expansion print image buffers have been proposed to overcome these problems. Such printer use band buffer systems wherein the print image buffer is initially given at a small capacity equivalent to 1/n page of information wherein n is an integer. When a print overrun error is generated, the capacity of the print image buffer is expanded to an appropriate size.

For example, Japanese Laid-Open Patent Publication No. HEI-2-52763 describes a printer with a text memory (intermediate buffer) and a video band buffer (print image buffer) provided in the same memory. The text memory is for storing text data received from the external source. The video band buffer is for storing bit image data developed from the text data in the text memory. The video band buffer has a fixed memory capacity for 128 raster scan lines (i.e., about 1/20 of a page) and can be expanded beyond this capacity when needed. Each time an overrun error occurs during printing of print data, the capacity of the video band buffer is expanded by an amount equivalent to 64 raster scan lines of data. The band buffer capacity will therefore sequentially increase when print overrun errors repeatedly occur during printing processes.

However, a large capacity video buffer is necessary when a great deal of processing time is required to decode print data received in compressed form and to develop the compressed print data into dot images. Because the storage capacity of the video buffer described in Japanese Laid-Open Patent Publication No. HEI-2-52763 increases only in increments equivalent to 64 raster scan lines each time an error occurs, print processes must repeatedly attempted and many errors generated before the buffer capacity increases to the point where print data can be printed. Print processes become troublesome and efficiency of printing greatly decreases.

On the other hand, if the video buffer is designed to its capacity expands with each error by a larger number of raster scan lines, for example, 100 to 150 raster scan lines instead of 64 raster scan lines, print data that puts a large load on data processes can be printed smoothly with fewer generations of errors. However, when capacity of the video buffer is caused to increase by such large amounts, the size of the video buffer can not be precisely set to a capacity appropriate for the load of the print data. Also, when the capacity of the video buffer is increased by too large an amount, the capacity of the coexisting text memory is reduced to an unnecessarily small amount.

SUMMARY OF THE INVENTION

It is an object of the present invention to provide a printer with a print image buffer that can be appropriately expanded according to the load for processing print data when a print overrun is generated.

To achieve the above and other objects, there is provided a printer including a reception data buffer, an intermediate buffer, decoding means, print image buffer, and print means. The intermediate buffer has a storage capacity variable depending on compressed print data received from an external source, and the intermediate buffer and the print image buffer share a memory space having a fixed capacity. The intermediate buffer includes a plurality of bands. The compressed print data for one page is sequentially stored in the plurality of bands of the intermediate buffer.

The reception data buffer stores the compressed print data received from the external source, such as personal computer or host computer. The intermediate buffer stores the compressed print data received from the reception buffer. The decoding means decodes the compressed print data stored in the intermediate buffer to develop dot image data. A data processing load is imposed when decoding the compressed print data depending on a nature of the compressed print data. A data processing load is imposed when decoding the compressed pressed print data depending on a nature, i.e., the type and/or amount, of the compressed print data. The print image buffer has a storage capacity for storing, on a dot-line basis, the dot image data developed by the decoding means. The print means receives the dot image data from the print image buffer and prints an image on a printing medium in accordance with the dot image data. The image is printed by repeatedly carrying out raster scans of the dot image data on the dot-line basis.

In accordance with the present invention, error detection means is provided for comparing a raster scanable number representative of a number of raster scans that can be performed with the dot image data stored in the print image buffer, with a raster scanned number representative of a number of raster scans actually performed by the print means. The error detection means produces an error signal indicative of an occurrence of a print overrun when a difference between the raster scanable number and the raster scanned number is smaller than a predetermined value. There is further provided load calculating means for calculating the data processing load imposed when the compressed print data is decoded. Buffer expansion means is also provided for expanding, when the error signal is produced from the error detection means, the storage capacity of the print image buffer to a degree determined according to the data processing load calculated by the load calculation means.

When the occurrence of the print overrun is detected during print processes of dot image data, the storage capacity of the print image buffer is expanded according to the data processing load of the compressed print data stored in each band of the intermediate buffer. Therefore, even when the data processing load is large, such as during encoding processes, so that dot image data preparation processes are delayed, the print image buffers will not be emptied of dot image data for printing and printer overrun can be prevented to a very high level.

In further accordance with the present invention, there is further provided threshold value storage means for storing a threshold value to be compared with the data processing load calculated by the load calculating means. Determination means determines whether or not the data processing load is greater than threshold value. Threshold value changing means reduces the threshold value depending on a difference between the data processing load and the threshold value each time the data processing load is greater than the threshold value stored in the threshold value storage means. The threshold value in the threshold value storage means is updated when the threshold value is reduced by the threshold value changing means.

As such, when an error is detected during printing processes, the present threshold value is reduced according to the difference between the present threshold value and the load each time the load in each band of the intermediate buffer is determined to be larger than the present threshold value. Also, the storage capacity of the dot image buffer is expanded according to loads larger than the reduced threshold value. As a result, when various types of print data are received, a first error is detected, but buffer amount of the expansion print image buffer can be expanded and set in an educated manner in accordance with trends in data processing load of print data so that only an extremely few errors are generated.

The threshold value may be reduced when all of the data processing loads of the compressed print data stored in the respective bands of the intermediate buffer are smaller than the threshold value but larger than an auxiliary threshold value smaller than the threshold value. The threshold value stored in the threshold value storage means is reduced depending on a difference between the data processing load and the auxiliary threshold value. The threshold value in the threshold value storage means is updated when the threshold value is reduced by the threshold value changing means.

In this arrangement, the buffer expansion means receives the determination made by the determination means. When that determination shows that all loads are smaller than the threshold value stored in the threshold value storage means, the threshold value is nevertheless reduced according to the amount that each load that is smaller than threshold value. Therefore, the threshold value can be adjusted by reduction even in regards to those loads that are almost the same size as the threshold value. In this aspect of the invention also, the buffer amount of the expansion print image buffer can be expanded and set in an educated manner in accordance with trends in load of data processing of print data so that only an extremely few errors are generated.

In the present invention, the load calculating means calculates the data processing loads based on the number of codes such as control codes and character codes when the print data is text data, and based on the number of raster scan lines in the auxiliary direction (which is perpendicular to the main scanning direction) for each one dot line when print data is image data.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A printer according to a preferred embodiment of the present invention will be described while referring to the accompanying drawings.

Figure 1:
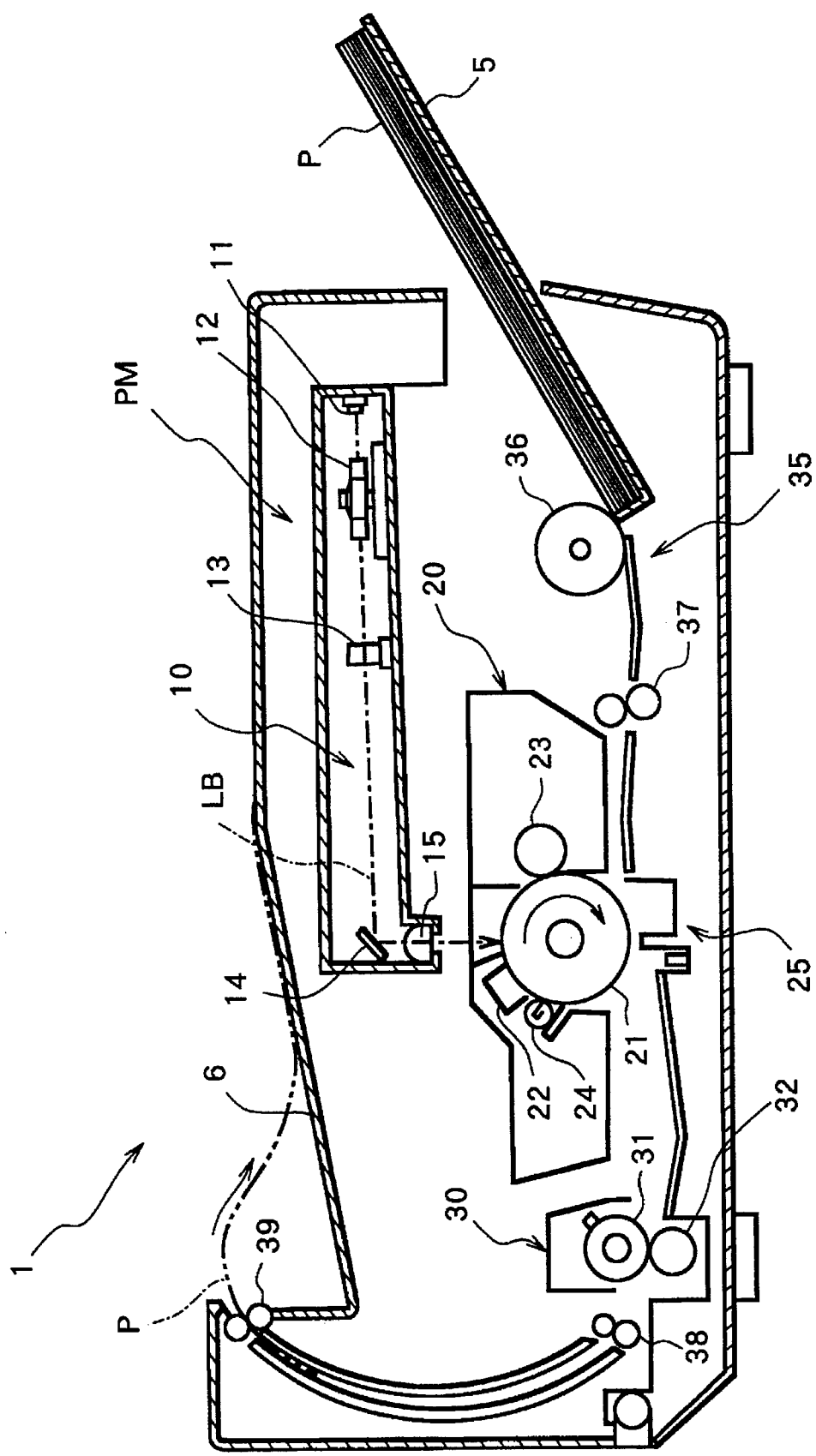
FIG. 1 is a cross-sectional view showing a laser printer to which the present invention is applied.

The present embodiment is directed to a laser printer that stores print data received from an external source in a memory and then prints the print data. First, a brief description will be provided for a printing mechanism PM provided to a laser printer 1 while referring to FIG. 1.

The laser printer 1 includes a laser scanner 10; process cartridge 20; image forming device 25 including a charger and a discharger needle; a fixing unit 30 including a heating roller 31 and a pressure roller 32; a sheet supplying roller 36; registration roller 37; a transport roller 38; and a discharge roller 39.

The laser scanner 10 includes a semiconductor laser 11; a hexagonal mirror 12 that is rotatable at a given speed; a condenser lens 13; reflecting mirror 14; and a lens member 15 formed from a synthetic resin material.

The processes cartridge 20 encloses a photosensitive drum 21; a primary charger 22; a development cylinder 23; and an exposure lamp 24.

The printing mechanism PM operates in the following manner. The semiconductor laser 11 emits laser beam LB which reflects off the hexagonal mirror 12. The laser beam LB is caused to scan a predetermined angular range in a main scanning direction by the predetermined deflection angle of each surface of the rotating hexagonal mirror 12. The scanning laser beam LB passes through the condenser lens 13 and is reflected downward off the reflecting mirror 14 toward the lens member 15. After passing through the lens member 15, the laser beams LB falls incident on the surface of the photosensitive drum 21 where it forms a latent image.

The latent image formed on the surface of the photosensitive drum 21 is developed with toner supplied from the development cylinder 23. The resultant visible image is printed by being transcribed onto a recording sheet P transported from the sheet cassette 5 by the transport unit 35. The printed recording sheet P is transported through the fixing unit 30 and is discharged onto a discharge tray 6 by the rollers 38 and 39.

Figure 2:
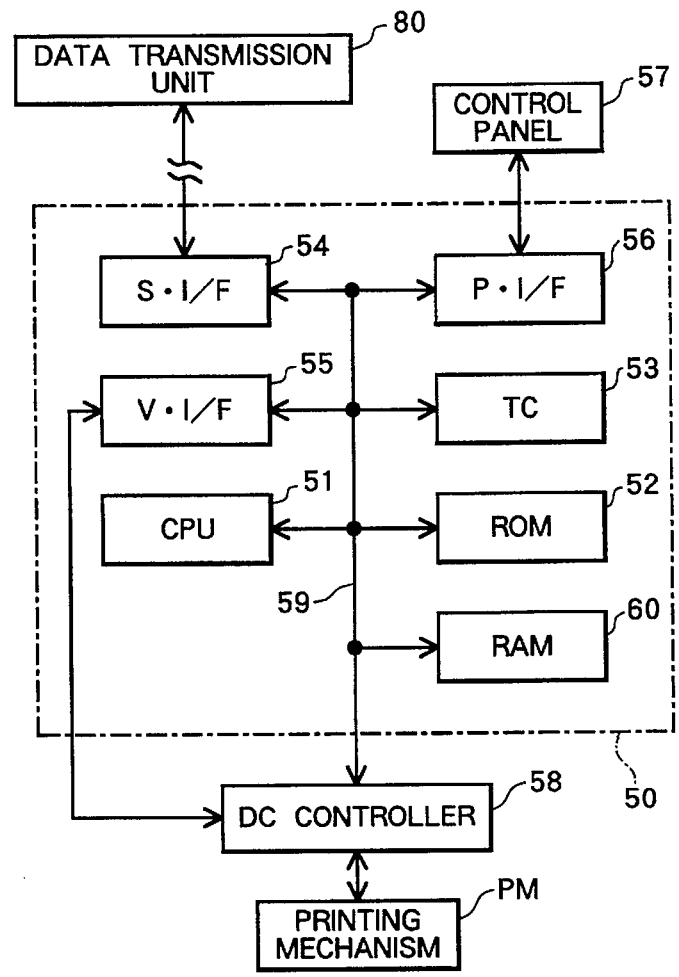
FIG. 2 is a block diagram showing a control system of the laser printer shown in FIG. 1.

Next, an explanation of the control system for the laser printer 1 will be provided while referring to FIG. 2. Only a brief description will be provided because the control system for the laser printer 1 is the same as is generally used in laser printers.

The video controller 50 of the laser printer 1 includes a CPU 51; a ROM 52 in which are stored various control programs for controlling the laser printer 1; a RAM 60 provided with various memories such as a reception buffer for receiving and storing data transmitted from the data transmission unit 80 of, for example, a personal computer or a host computer; timing control circuit (TC) 53 for generating a timing signal for controlling timing of storage of received data into and retrieval of stored data from the reception buffer; a serial interface (S I/F) 54 for receiving print data transmitted from the external data transmission unit 80; a video interface ((V I/F) 55 having two four kilobyte scan buffers, the video interface 55 outputting print information converted into bit image data to a serial DC controller 58; and a panel interface (P I/F) 56 for receiving signals from a control panel 57. These components are individually connected to the CPU 51 via a bus 59.

A main motor for driving the photosensitive drum 21 and the transport unit 35; a fixing heater for the heating roller 31; and other components such as electronic circuits are also provided to the printing mechanism PM. The serial DC controller 58 controls drive of the main motor, the fixing heater, and the electronic circuits in addition to controlling drive of a scanning motor for driving the semiconductor laser 11 and the hexagonal mirror 12.

Figure 3:
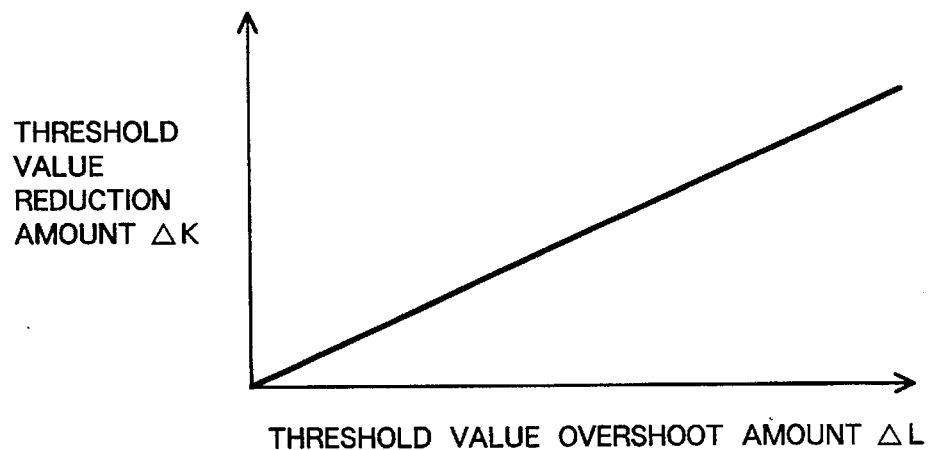
FIG. 3 is an explanatory diagram for illustrating a threshold value reduction amount map.

In addition to various programs normally provided for controlling operation of a normal laser facsimile, the ROM 52 further stores a font memory, a memory management program, a threshold value reduction amount map (for determining a threshold value reduction amount $\Delta k$), and a print control program. The font memory stores dot pattern data for printing a plurality of characters such as letters and symbols. The memory management program is for managing the start address and memory capacity of memories 61 to 69 provided in the ROM 60. An example of the threshold value reduction map for determining a threshold value reduction amount $\Delta k$ is shown in FIG. 3. The threshold value reduction amount $\Delta k$ is determined based on a threshold value overshoot amount $\Delta L$ indicative of an amount in which the calculated load LI exceeds the threshold value K. The print control program is a particular feature of the present invention and will be described later.

Further, an initial threshold value K is stored in the ROM 52. The initial threshold value K is for determining the data processing load of compressed print data stored in each band of the intermediate buffers 63 to 65. The data processing load is determined in order to set the buffer capacity of an expansion print image buffer 68 (to be described later), which is provided in addition to the print image buffer 69.

The threshold value K is set to "160" when the load to be compared with the threshold value K is defined by code numbers. The threshold value K is also set to "100" when the load to be compared with the threshold value K is defined by raster scan number. The threshold value "160" is applied when the print data is text data. The text data places a large load on the bands of the intermediate buffers 63 to 65. The threshold value "100" is applied when the print data is image data. The threshold value in this case represents an amount of image data that might cause an overrun error to be generated. One raster scan line represents one line of dots printed according to a single linear scan of the laser beam LB.

Figure 4:
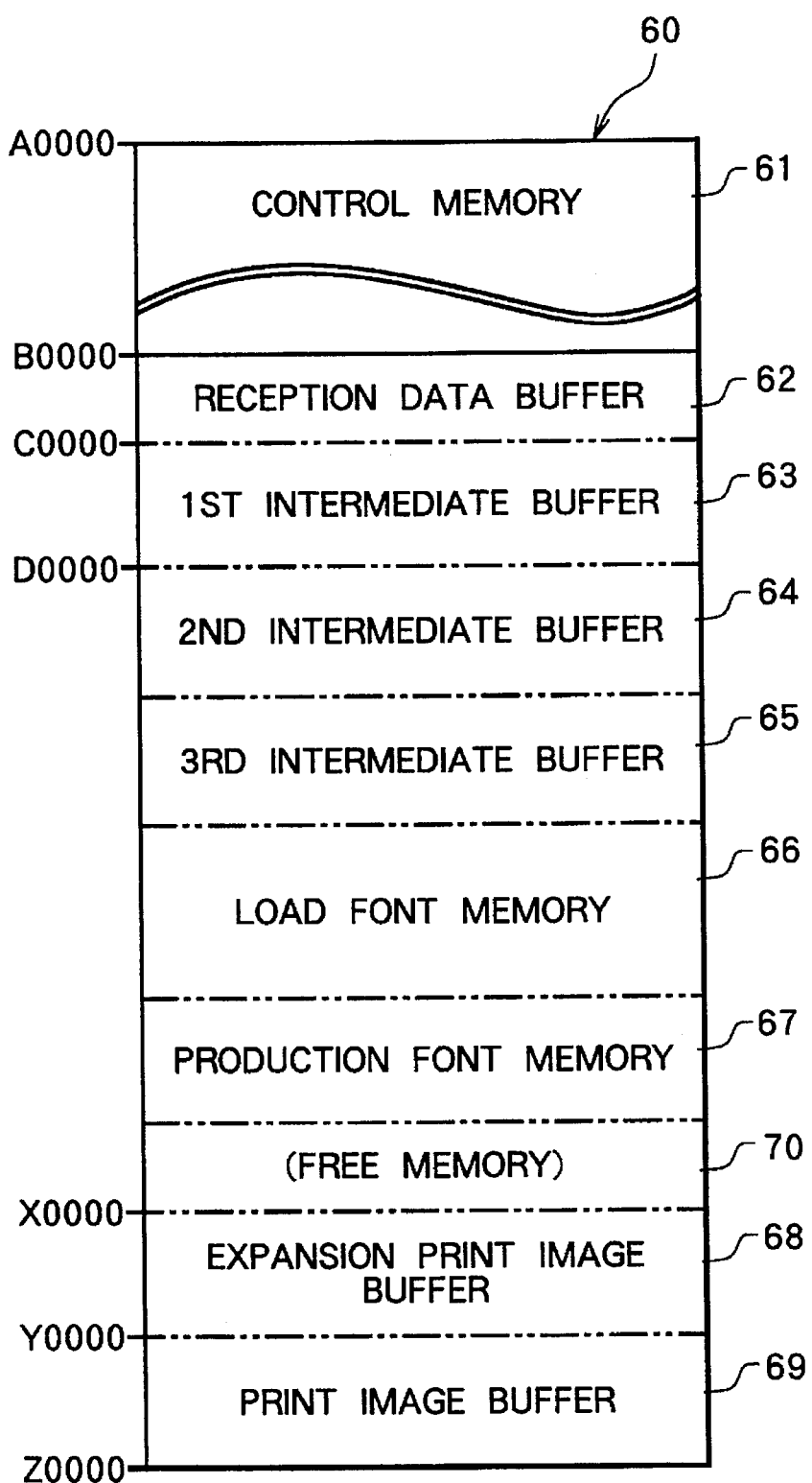
FIG. 4 is an explanatory diagram for illustrating a memory map of a RAM.

The memory of the RAM 60 is divided as shown in FIG. 4 into a control memory 61 with a predetermined capacity; a reception data buffer 62 for temporarily storing print data received from the data transmission unit 80; intermediate buffers 63 through 65 each for storing one page's worth of compressed print data received from the reception data buffer 62; a load font memory 66 for receiving and storing font data transmitted from the data transmission unit 80; a production font memory 67 for storing font data received from the font memory of the ROM 53 or production font data produced by changing font data from the load font memory 66; the expansion print image buffer 68; and the print image buffer 69 with a predetermined capacity (for example, 100 KB). Various pointer buffers for temporarily storing results of calculations performed in the CPU 51 are provided in the control memory 61.

That is, the control memory 61 with a predetermined capacity is provided from the start address A0000 of the RAM 60, the reception data buffer with a predetermined capacity is provided from the address B0000. The intermediate buffers 63 through 65, the load font memory 66, the production font memory 67, and the expansion print image buffer 68 are provided in coexistence adjacent to each other from the address C0000 to the address Z0000. The intermediate buffers 63 through 65, the load font memory 66, the production font memory 67, and the expansion print image buffer 68 are structured so that their buffer capacity and memory can be changed at any time according to the type and amount of print data received. Therefore, the start address of the buffers and memories 63 through 68 change in accordance with changes in the buffer capacity and memory.

Next, an explanation of the first through third intermediate buffers 63 through 65 will be provided. Since all the first through third intermediate buffers 63 through 65 have the same configuration, only the first intermediate buffer 63 will be described while referring to FIG. 5. The second intermediate buffer 64 is for storing a succeeding page of print data when one page's worth of print data is stored in the first intermediate buffer 63. The third intermediate buffer 65 is for storing a succeeding page of print data when one page's worth of print data is stored in the second intermediate buffer 64.

Figure 5:
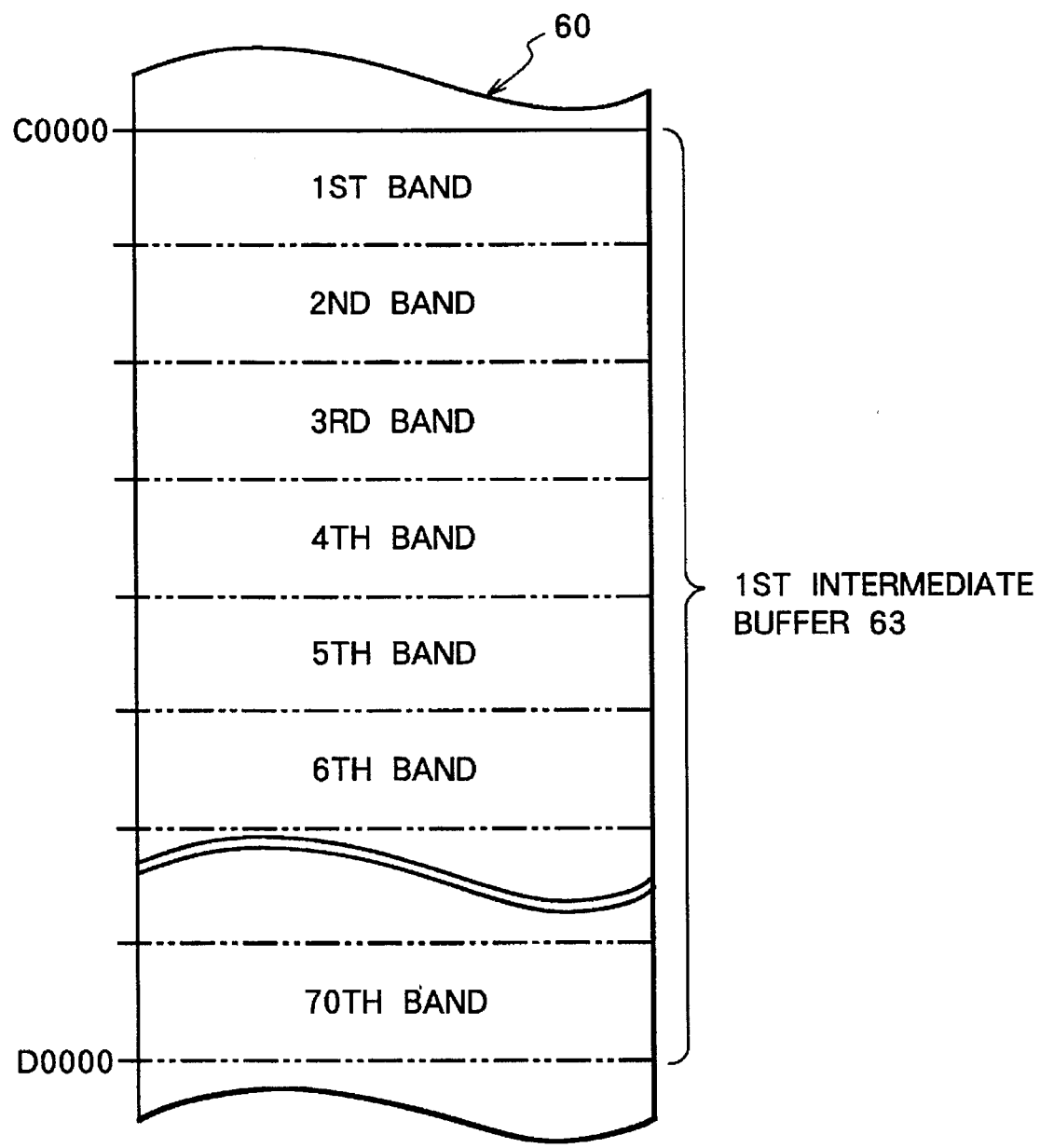
FIG. 5 is an explanatory diagram for illustrating an a memory space of a first intermediate buffer.

The first intermediate buffer 63 is for storing one page's worth of compressed print data received from the reception data buffer 62. As shown in FIG. 5, the first intermediate buffer 63 is divided into 70 separated bands: 1st through 70th band.

Normally, each of the 70 bands has a buffer capacity of about 1 KB so that each band can store control codes and/or text codes for a single block of a page's worth of information divided into 70 blocks. Each band can store 120 codes (including character codes and various control codes, such as for indicating character size and enhancement features required for controlling printing), which corresponds to about two lines' worth of text at a ten point character size. However, when the print character size is less than 10 points, the capacity of each band appropriately expands to larger than 1K so that two lines can be stored even if the total number of codes in forming the two lines is greater than 120. Also, when the received print data is image data, normally about 100 raster scan lines' worth of image data can be stored in each band. However, when overlapped printing is performed in response to a position command, the capacity of each band is appropriately expanded to more than 1 KB so that more than 100 raster scan lines' worth of image data can be stored in each band.

Figure 6:
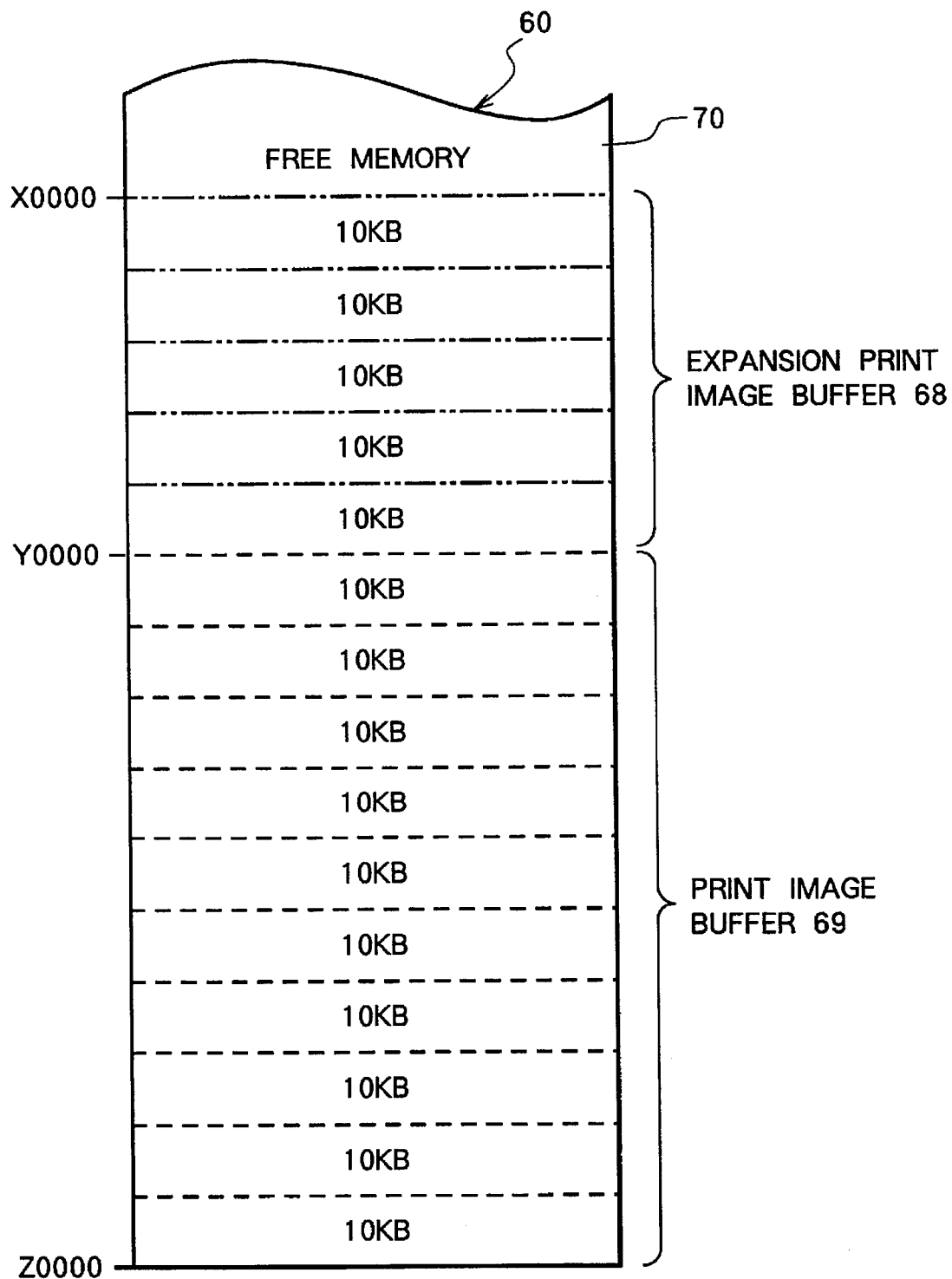
FIG. 6 is an explanatory diagram for illustrating a print image buffer and an expansion print image buffer.

Next, an explanation of the expansion print image buffer 68 and the print image buffer 69 will be provided while referring to FIG. 6.

The print image buffer 69 includes a fixed buffer capacity of 100K divided into 10 basic capacities (bands) of 10 KB. When the data processing load for one page's worth of print data stored in each intermediate buffer 64 through 66 is equal to or less than the threshold value K, bit image data can be stored in the print image buffer 69 without print overrun errors being generated during print processes.

The expansion print image buffer 68 is for preventing print overrun errors when the load of print data stored in each intermediate buffer 64 through 66 is greater than the threshold value K. When the load is greater than the threshold value K, the buffer capacity of the print image buffer 69 expands into the expansion print image buffer 68 so that the storage region for storing bit image data can be expanded. The expansion print image buffer 68 allows expansion in bands set in basic capacity amounts of 10 KB. FIG. 6 shows the expansion print image buffer 68 set with 50 KB of buffer capacity in five separate expansion bands. Therefore, the total buffer capacity of the print image buffer in which bit image data can be stored is set to the 150 KB (i.e., 50 KB of the expansion print image buffer 68 plus 100 KB of the print image buffer 69). The free memory 70 is at the end of the usable region of the RAM 60 and is used for the expansion print image buffer 68 and the like.

Next, an explanation of a print control routine performed by the video controller 50 of the laser printer 1 will be provided while referring to the flowcharts shown in FIGS. 7 through 11. Individual steps of the flowcharts will be referred to as Si wherein i is the number of individual steps.

Figure 7:
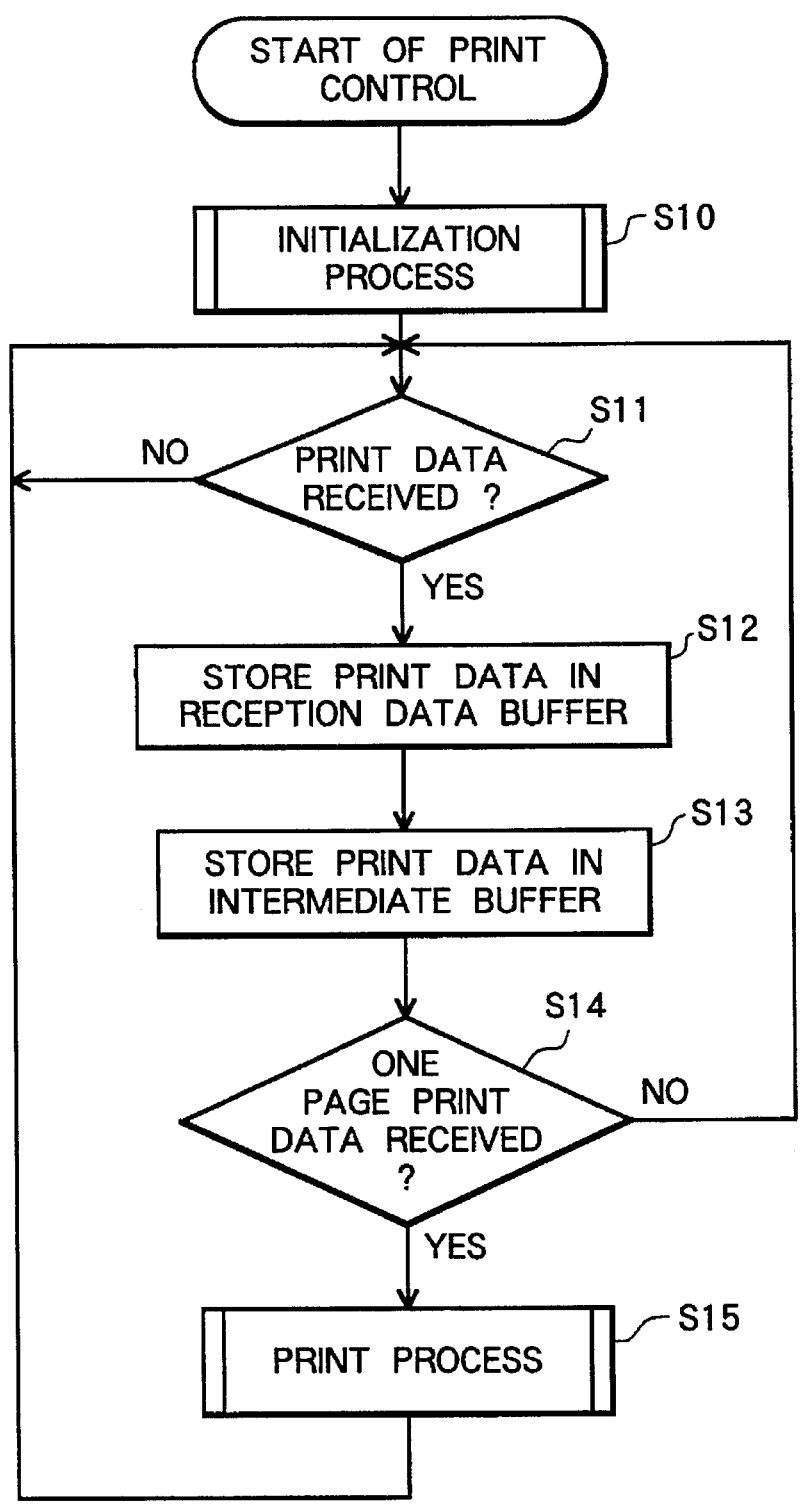
FIG. 7 is a flowchart for illustrating a print control routine.

The routine represented by the flowchart of FIG. 7 starts when the power source of the laser printer 1 is turned on. First, initialization processes for initializing the printing mechanism PM are executed in S10. Next, whether or not print data has been received is determined in S11 based on a data transmission start signal transmitted from the external data transmission unit 80. If so (i.e., S11 is YES), the received data is first temporarily stored in the reception data buffer 62 in S12. Then the print data stored in the reception data buffer 62 is stored in the first intermediate buffer 63 in S13. Next, whether or not reception of one page's worth of print data is completed is determined in S14. If not (i.e., S14 is NO), S11 through S14 are repeated so that received print data is serially stored in the bands of the first intermediate buffer 63.

Figure 8:
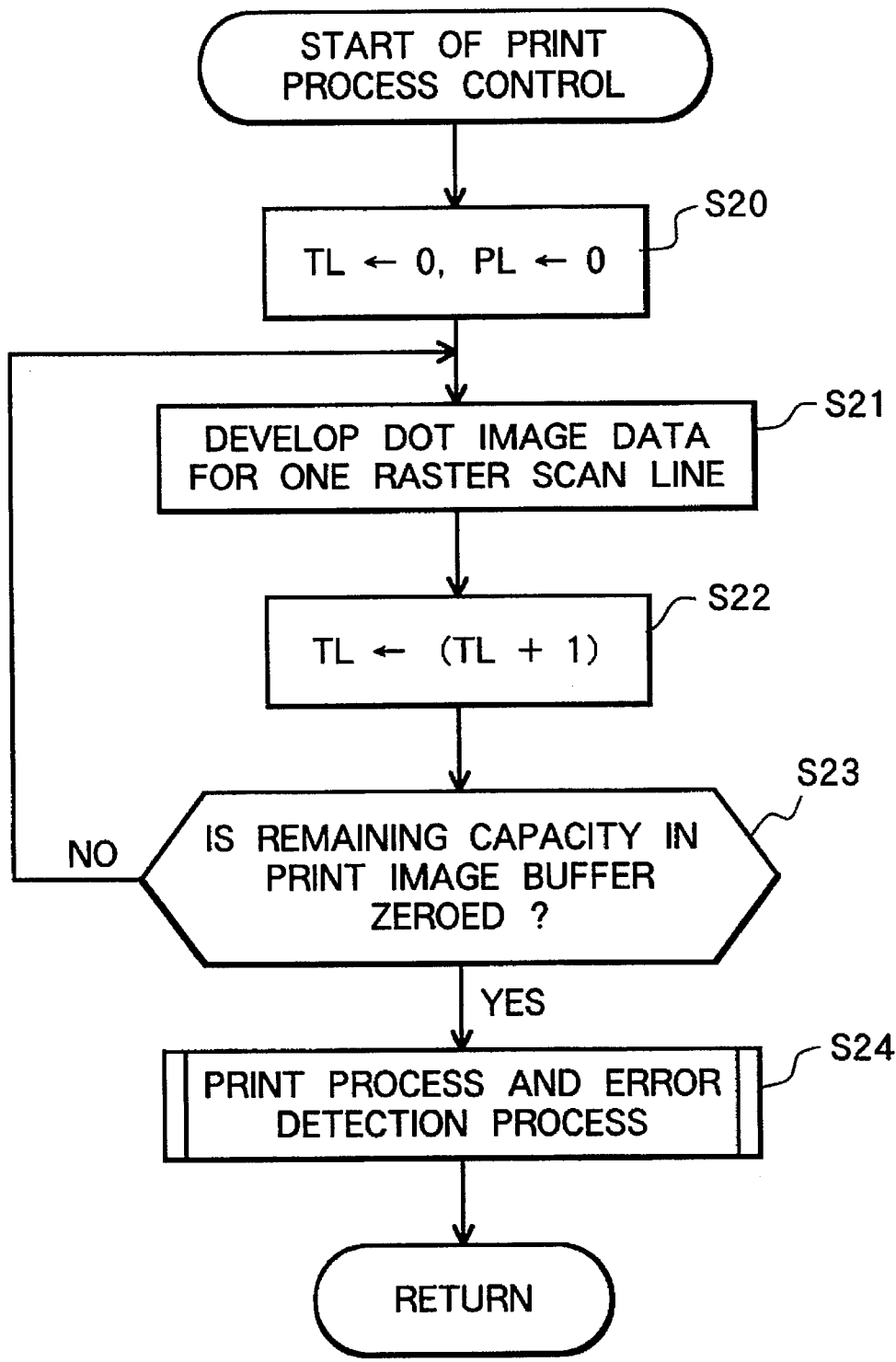
FIG. 8 is a flowchart for illustrating a print process control routine.

When one page's worth of print data is stored in the first intermediate buffer 63 (i.e., S14 is YES), the print process routine shown in FIG. 8 is executed in S15.

When the print process routine is started, a developed raster number count value TL provided in the control memory 61 and a print raster counter count value PL are set to zero in S20. Then, a predetermined raster amount α of dot image data (for example, dot image data from one raster scan line) is developed from the start address of the print image buffer 69 in S21. Then the developed raster number count value TL is incremented by the predetermined raster scan line amount α (i.e., one in this example) in S22. Whether or not the amount of open capacity remaining in the print image buffer 69 is almost "0" is determined in S23. If not (i.e., S23 is NO), S21 through S23 are repeated.

Figure 9:
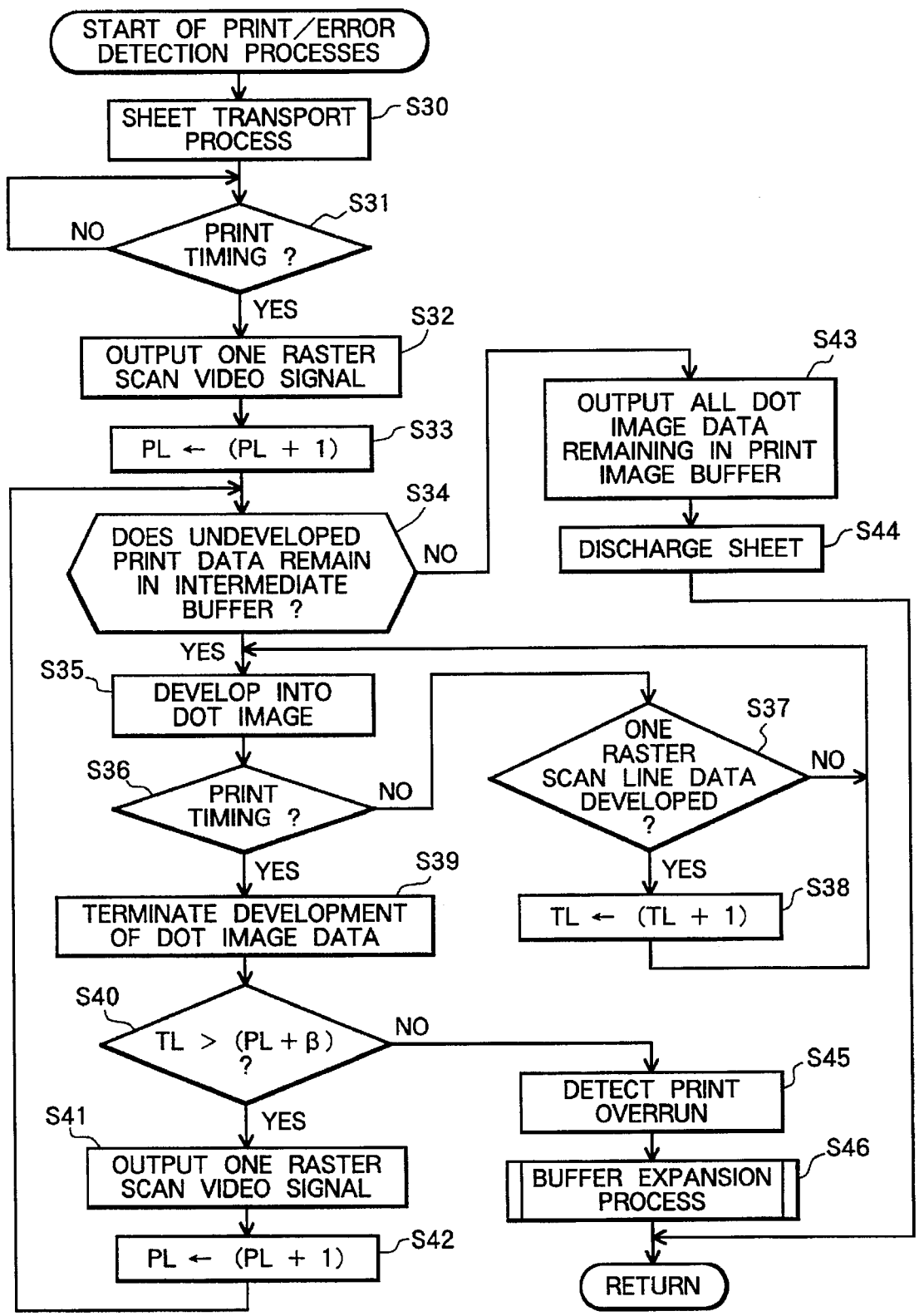
FIG. 9 is a flowchart for illustrating print process/error detection process routine.

When the remaining capacity in the print image buffer 69 is about "0" (i.e., S23 is YES), the print routine and the error detection routine represented by the flowchart shown in FIG. 9 are performed in S24.

When these routines are started, the serial DC controller 58 drives the main motor to drive the first the transport unit 35 so that a recording sheet P from the sheet supply cassette 5 is transported through the transport pathway to the print start position in S30. Next, whether or time has come to print is determined in S31 based on a standard synchronization signal outputted with each scan of the laser beam LB. If time to print has arrived (i.e., S31 is YES), one raster scan line's worth of dot image data is retrieved from the print image buffer 69 in S32. Also in S32, the serial DC controller 58 outputs a video signal according to this one raster scan line's worth of data to the semiconductor laser 11, which generates a laser beam LB to form a latent image of the raster scan line on the surface of the photosensitive drum 21.

Next the print raster counter count value PL is incremented by one in S33 according to the outputted video signal of the one raster scan line. Whether or not undeveloped print data remains in the first intermediate buffer 63 is determined in S34. If so (i.e., S34 is YES), a predetermined amount, for example, a predetermined number of bytes, of the undeveloped print data is developed and then stored in the print image buffer 69 in S35. Print timing is determined in S36. If time to print has not arrived (i.e., S36 is NO), whether or not dot image data equivalent to the predetermined raster scan line amount α (for example, one raster scan line's worth of data) has been developed is determined in S37. If not (i.e., S37 is NO), S35 through S37 are repeated until one raster scan line's worth of data is developed (i.e., S37 is YES), whereupon the developed raster number count value TL is incremented by one in S38, and S35 through S37 are repeated.

When during S35 through S37, it is determined in S36 that time to print has arrived (i.e., S36 is YES), the development processes for the dot image data are terminated in S39, whereupon whether or not developed raster number count value TL is larger than a number of raster scan lines calculated by adding a predetermined amount β (for example, a number of raster scan lines equivalent to several row's worth of printed text) to the print raster counter count value PL. If so, that is, if enough dot image data for print processes is stored in print image buffer 69 so that print overrun will not occur (i.e., S40 is YES), a video signal equivalent to one raster scan line is outputted in S41, the print raster counter count value PL is incremented by one in S42, and the program returns to S34.

As described above, S34 through S42 are repeatedly executed until all the print data in the first intermediate buffer 63 is completely developed (i.e., S34 is NO), whereupon all the dot image data developed and stored in the print image buffer 69 is serially outputted in video signals representing one raster scan line's worth of information in S43. A latent image of the received print data is formed on the surface of the photosensitive drum 21, then the latent image is transferred onto the recording sheet P and printed there. The drive of the transport unit 35 discharges the recording sheet P onto the discharge tray 6 (S44). Then this print process and error detection routine is completed and the program returns to S11 of the print control routine.

Figure 10:
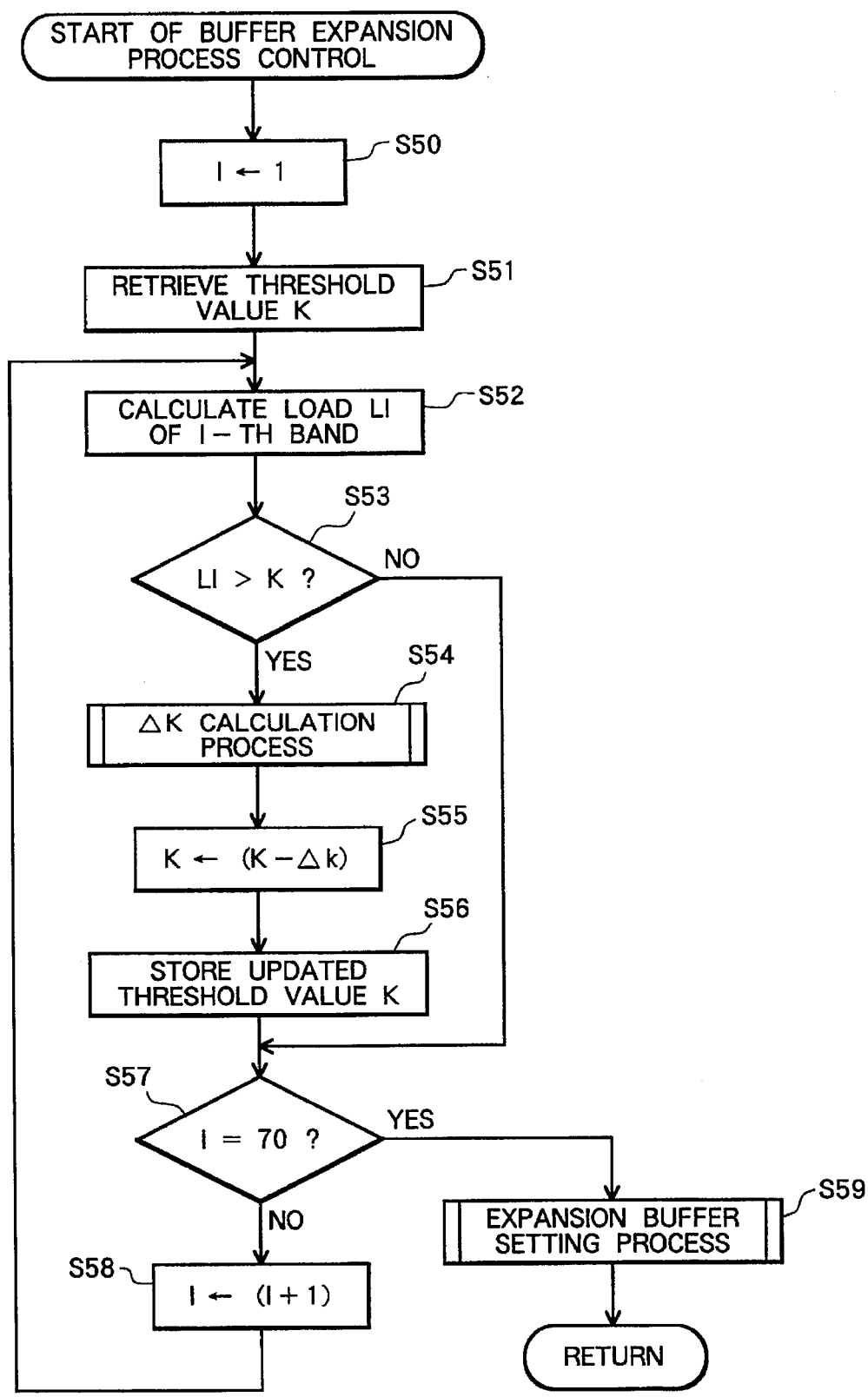
FIG. 10 is a flowchart for illustrating a buffer expansion process control routine.

When the development raster number count value TL is equal to or less than the raster number calculated by adding the predetermined amount β to the print raster counter count value PL (i.e., S40 is NO), this means that processes for preparing dot image data are delayed because a great deal of print data stored in the bands of the first intermediate buffer 63 is generating a large data processing load. As a result, more time is required for decoding processing. In the meantime, almost no dot image data needed for printing processes is stored in the print image buffer 69. Therefore, when S40 is NO, a print overrun signal is outputted so that a warning alarm is sounded in S45. Then the buffer expansion control routine shown in FIG. 10 is executed in S46.

When this routine is started, the counter value I, which is provided the control memory 61, of band counters for serially indicating each of the 70 bands formed to the intermediate buffers 63 through 65 are all set to an initial value of 1 in S50. The threshold value K in the threshold value memory provided to the control memory 61 is retrieved in S51. Although not shown in the drawings, when a threshold value clear signal, which is for resetting the threshold value K of the threshold value memory, is received from the data transmission unit 80 before more print data is transmitted, the initial threshold value K stored in the ROM 52 is retrieved and set in the threshold value memory.

Next, the data processing load LI stored in the first band of the first intermediate buffer 63 indicated by band count value I is calculated in S52. When codes such as control codes and character codes for text data are stored in the first band of the first intermediate buffer 63, the number of codes is calculated as the load LI. On the other hand, when image data is stored in the first band, the number of raster scan lines in the auxiliary scanning direction (which is perpendicular to the main scanning direction for print one dot line) is calculated as the load LI.

Next, when the load LI is larger than the threshold value K stored in the threshold value memory (i.e., S53 is YES), the reduction amount Δk in the threshold value is calculated in S54 based on the load LI, the threshold value K, and the reduction amount map stored in the ROM 52. That is, the threshold value overshoot amount ΔL is determined using the following formula:

$$\Delta L = Li - K.$$

Then, the threshold value reduction amount Δk that corresponds to the thus-determined threshold value overshoot amount ΔL is determined from the threshold value reduction amount map. In S55, a new smaller threshold value K is determined by subtracting the reduction amount Δk from the present threshold value K as shown in S55 of the flowchart in FIG. 10. The threshold value memory is updated with the new threshold value K in S56.

Figure 11:
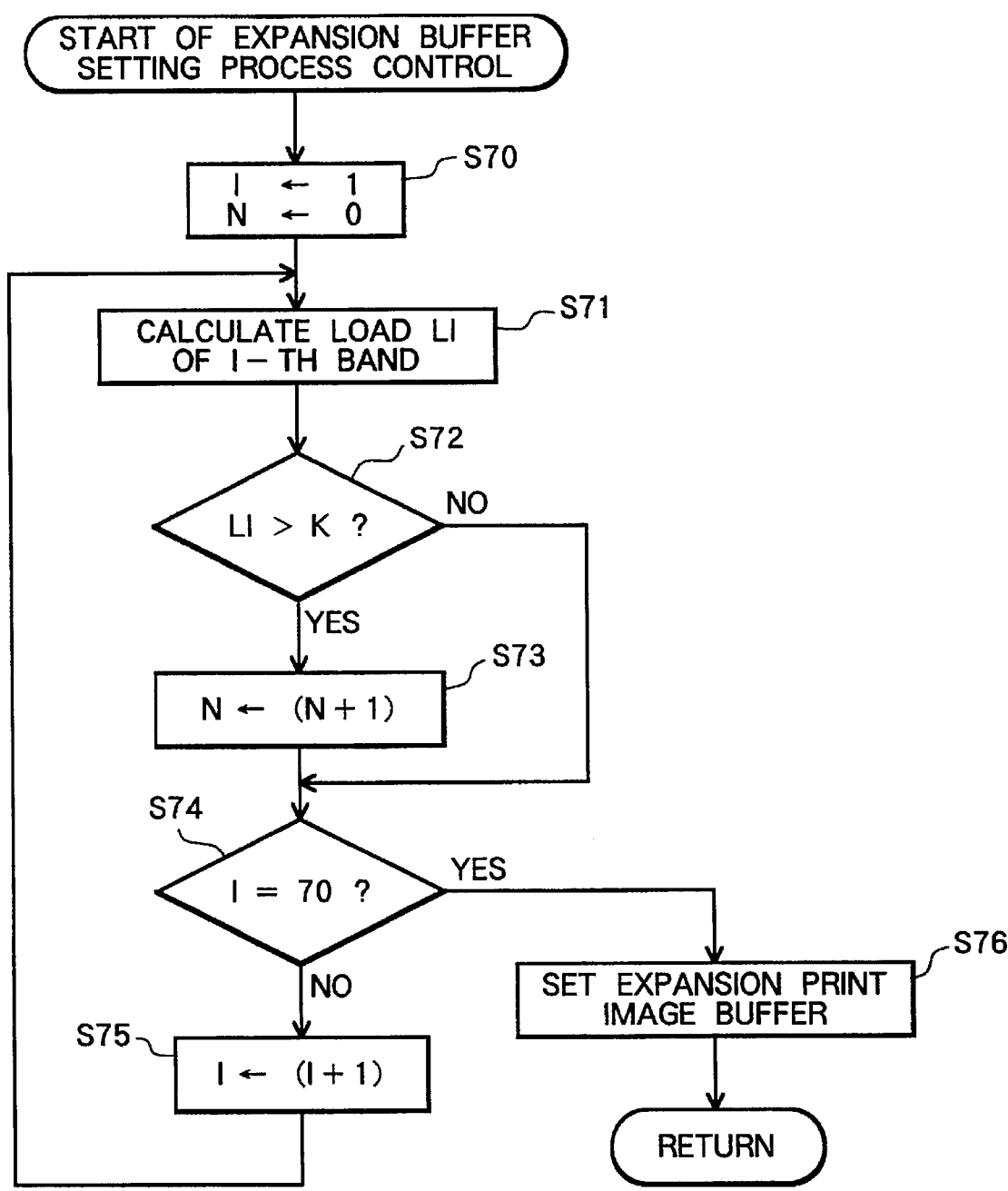
FIG. 11 is a flowchart for illustrating an expansion buffer setting process control routine.

When the band count value I has not reached the final value of "70" (i.e., S57 is NO), the band count value I is incremented by one in S58 and the program returns to S52. Next, S52 through S58 are repeatedly executed until the band count value 1 attains the final value of "70" (i.e., S57 is YES), whereupon the expansion buffer setting control routine shown in FIG. 11 is executed in S59.

When this routine is started, in S70 an initial value of "1" is set as the band count value I and an initial value of "1" is set as the expansion band number N of the expansion band number memory provided in the control memory 61.

The data processing load LI stored in the first band of the first intermediate buffer 63 indicated by the band count value I is calculated in S71. When this load LI is larger than the new threshold value K updated in the threshold value memory (i.e., S72 is YES), the expansion band number N is incremented by one in S73. Next, when the band count value I has not attained the final value of "70" (i.e., S74 is NO), the band count value I is incremented by one in S75 and the program returns to S71.

Next, S71 through S75 are repeatedly executed until the band count value I reaches the final value of "70" (i.e., S74 is YES), whereupon the expansion print image buffer 68 expanded according to the expansion band number N is set in S76 by the memory management program. This routine, the buffer expansion control routine, the print process, and error detection control routine are serially completed and the program returns to S11 of the print control routine. For example, when the new threshold value K is set to a small value so that the expansion band number N is five, that is, so that five bands of the first intermediate buffer 63 have a data processing load LI equal to or greater than the new threshold value K, the buffer capacity of 50 KB, corresponding to the five expansion bands, is set in the expansion print image buffer 68 and the start address of the expansion print image buffer 68 is set to X000.

As described above, when a print overrun error is detected during printing, each time a load LI is determined to be greater than the threshold value K, the threshold value K is reduced according to the difference between the load LI and the threshold value K. Also, the buffer capacity of the expansion print image buffer 68 is precisely expanded according to a load L that is larger than a small threshold value K. Therefore, even when various types of print data are being received, although an error will be detected during the first print process, the capacity of the expansion print image buffer 68 will be set in an educated manner and with generation of very few errors according to the trend in the data processing load LI of received print data. No dot image data for printing will be lost from these print image buffers 68 and 69 and print overrun errors will be dramatically decreased.

Figure 12:
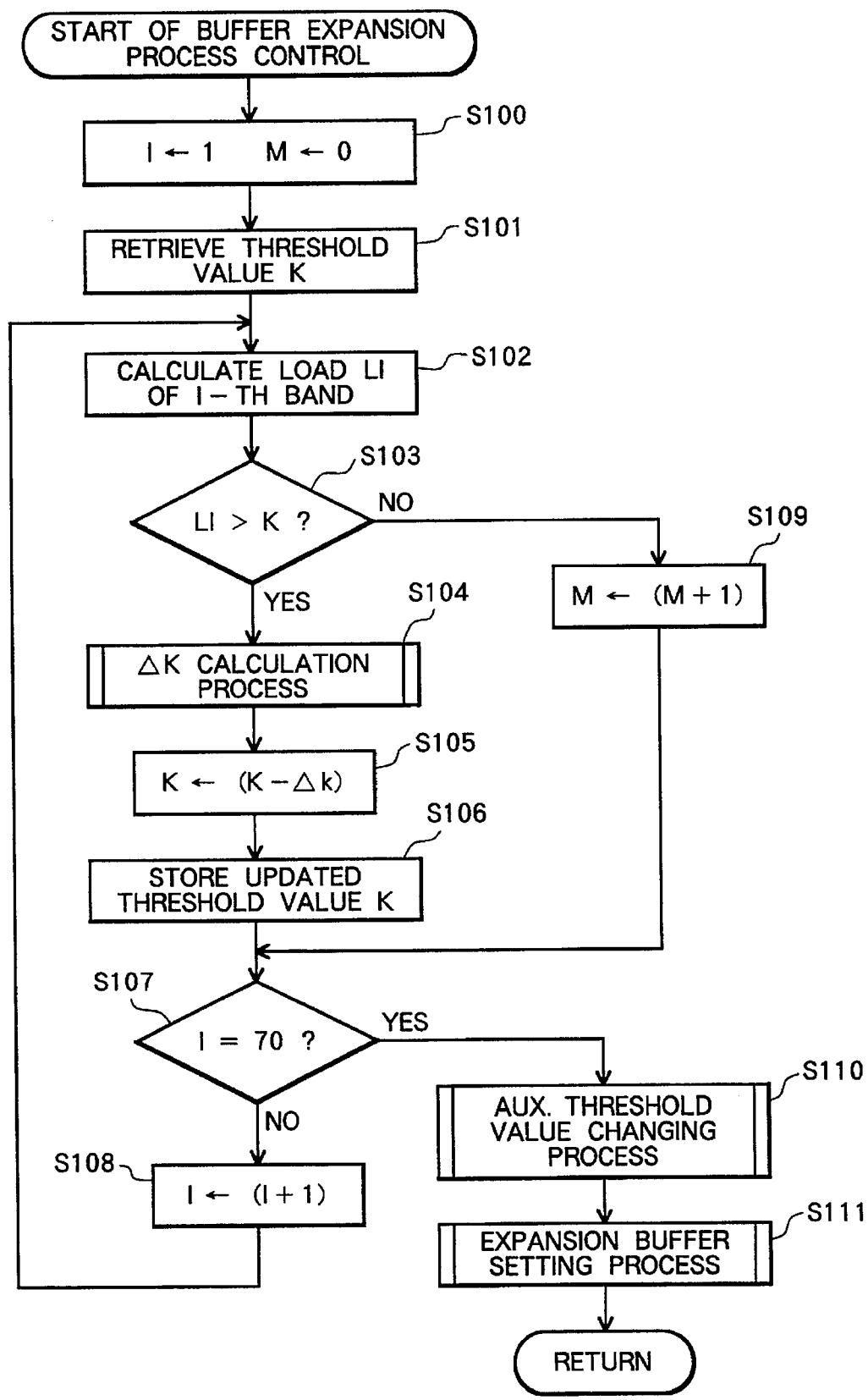
FIG. 12 is a flowchart for illustrating a buffer expansion process control routine.

The buffer expansion control routine shown in FIG. 10 can be modified as shown in FIG. 12. In this case, when all loads L are equal to or less than the threshold value K in regards to each load L that is larger than a standard threshold value, which corresponds to 90% of all threshold values K, but that is smaller than threshold value K the threshold value K can be reduced according to an overshoot amount ΔL as contrasted to the standard threshold value. Explanation of processes that are the same as described in the embodiment will be omitted here.

When the load LI of the first band of the first intermediate buffer 63 indicated by the band count value I is greater than the threshold value K stored in the threshold value memory (i.e., S103 is YES), S104 through S106 are executed in the same manner as for S54 through S56 of the embodiment. When the load LI of the first band is smaller than the threshold value K (i.e., S103 is NO), an auxiliary band counter count value M provided in the control memory 61 for counting the number of loads L smaller than the threshold value K is incremented by one in S109 and the program proceeds to S107.

Figure 13:
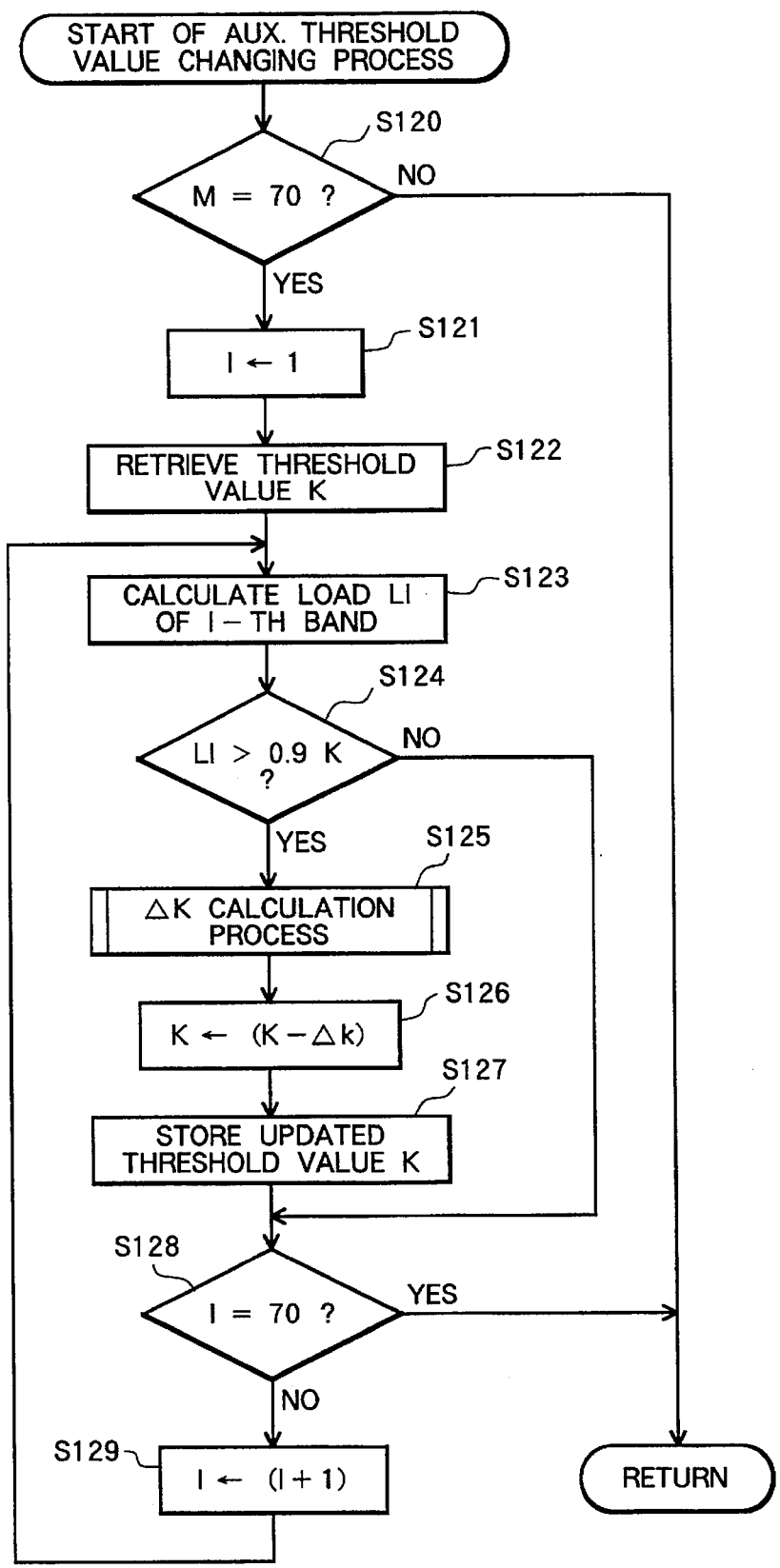
FIG. 13 is a flowchart for illustrating an auxiliary threshold value changing process control routine.

When the band count value I reaches the final value of "70" (i.e., S107 is YES), the auxiliary threshold value change control routine represented by the flowchart shown in FIG. 13 is executed in S110.

When the auxiliary band count value M is not "70" at the start of this routine (i.e., S120 is NO), this routine is promptly terminated and the program returns to S111 of the buffer expansion control routine.

However, when the auxiliary band count value M is "70" (i.e., S120 is YES), S121 through S123 are executed in the same manner as S50 through S52. When the load LI in the first band is greater than the standard threshold value 0.9K (i.e., S124 is YES), S125 through S127 are executed in the same manner as S104 through S106, the program returns to S123 via S128 and S129, whereupon S123 through S129 are repeatedly executed.

When the band count value I attains the final value of "70" (i.e., S128 is YES), this routine is completed and the program returns to the buffer expansion control routine in S111, whereupon the same buffer expansion control routine shown in FIG. 11 is executed. Then this routine, the buffer expansion control routine, the print processes and error detection control routine, and the print processes control routine are serially completed. Then the program returns to the print control routine.

When all loads L are smaller than the threshold value K, the threshold value K is reduced according to the amount that each load L (smaller than threshold value K, but larger than the standard threshold value 0.9K) overshoots the standard threshold value 0.9K. Therefore, the threshold value K can be adjusted by reduction even in regards to those loads L that are almost the same size as the threshold value K. The buffer amount of the expansion print image buffer 68 can be expanded and set in an educated manner in accordance with trends in load L of data processing of print data so that only an extremely few errors occur. As a result, the print image buffers 68 and 69 will not be emptied of dot image data for printing.

While the invention has been described in detail with reference to specific embodiments thereof, it would be apparent to those skilled in the art that various changes and modifications may be made therein without departing from the spirit of the invention, the scope of which is defined by the attached claims.

For example, the initial threshold value K and the standard threshold value 0.9K described above for image data and the initial threshold value K described above for text data are only examples. Any appropriate value can be set according to the buffer capacity of each band in the intermediate buffers 63 through 65. Also, in S73 of the expansion buffer setting control routine, the buffer capacity of the expansion print image buffer 68 can be expanded only by a capacity proportional to the number of bands determined to have a load L greater than the threshold value K.

What is claimed is:

1. A printer comprising:

a reception data buffer for storing compressed print data received from an external source;

an intermediate buffer for storing the compressed print data received from said reception buffer;

decoding means for decoding the compressed print data stored in said intermediate buffer to develop dot image data, a data processing load being imposed on said decoding means when decoding the compressed print data, the data processing load varying depending on the compressed print data;

a print image buffer having a storage capacity for storing, on a dot-line basis, the dot image data developed by said decoding means;

print means for receiving the dot image data from said print image buffer and printing an image on a printing medium in accordance with the dot image data, wherein the image is printed by repeatedly carrying out raster scans of the dot image data or the dot-line basis;

error detection means for comparing a raster scanable number representative of a number of raster scans that can be performed with the dot image data stored in said print image buffer, with raster scanned number representative of a number of raster scans actually performed by said print means, said error detection means producing an error signal indicative of an occurrence of a print overrun when the raster scanned number is larger than the raster scanable number and when a difference between the raster scanable number and the raster scanned number is smaller than a predetermined value;

load calculating means, operable when the error signal is produced from said error detection means, for calculating the data processing load of the compressed print data;

threshold value storage means for storing a threshold value to be compared with the data processing load calculated by said load calculating means;

determination means for determining whether or not the data processing load is greater than the threshold value;

threshold value changing means for reducing the threshold value depending on the difference between the data processing load and the threshold value when the data processing load is greater than the threshold value stored in said threshold value storage means, wherein the threshold value in said threshold value storage means is updated when the threshold value is reduced by said threshold value changing means; and buffer expansion means for expanding, when the error signal is produced from said error detection means, the storage capacity of said print image buffer to a degree determined according to a difference between the data processing load calculated by said load calculation means and an updated threshold value, whereby after occurrence of the print overrun, subsequent occurrences of the print overruns can effectively be prevented.

2. A printer according to claim 1, wherein calculation of the data processing load by said load calculating means and determination by said determination means are performed with respect to the compressed print data stored in each of said plurality of bands.

3. A printer according to claim 2, wherein said buffer expansion means comprises a counter for counting a number of bands storing the compressed print data whose data processing loads are greater than an updated threshold value, and wherein the degree in which the storage capacity of said print image buffer is expanded is determined according to a count number in said counter.

4. A printer according to claim 3, wherein said buffer expansion means further comprises a predetermined number of expansion memories each having a predetermined storage capacity, and wherein a selected number of expansion memories are added to said print image buffer to expand the storage capacity of said print image buffer.

5. A printer according to claim 4, wherein the predetermined number of expansion memories and said print image buffer share the memory space together with the said intermediate buffer.

6. A printer according to claim 1, wherein said load calculating means calculates the data processing load based on number of codes including control codes and character codes when the compressed print data is text data.

7. A printer according to claim 1, wherein said load calculating means calculates the data processing load based on number of raster scans to be performed with respect to the compressed print data when the compressed print data is image data.

8. A printer according to claim 1, wherein said intermediate buffer has a storage capacity variable depending on the compressed print data received from said external source, an wherein said intermediate buffer and said print image buffer share a memory space having a fixed capacity.

9. A printer according to claim 8, wherein said intermediate buffer includes a plurality of bands, the compressed print data for one page being sequentially stored in said plurality of bands.

10. A printer according to claim 9, wherein said print means prints the image when the compressed print data for one page is stored in said plurality of bands.

11. A printer according to claim 10, wherein said error detection means comprises a first counter for counting the raster scanable number and a second counter for counting the raster scanned number, and wherein a count number in said first counter is incremented each time the dot image data for one dot-line is stored in said print image buffer and a count number in said second counter is incremented each time said print means raster scans the dot image data for one dot-line.

12. A printer comprising:

a reception data buffer for storing compressed print data received from an external source;

an intermediate buffer for storing the compressed print data received from said reception buffer;

decoding means for decoding the compressed print data stored in said intermediate buffer to develop dot image data, a data processing load being imposed on said decoding means when decoding the compressed print data, the data processing load varying depending on the compressed print data;

a print image buffer having a storage capacity for storing, on a dot-line basis, the dot image data developed by said decoding means;

print means for receiving the dot image data from said print image buffer and printing an image on a printing medium in accordance with the dot image data, wherein the image is printed by repeatedly carrying out raster scans of the dot image data on the dot-line basis;

error detection means for comparing a raster scanable number representative of a number of raster scans that can be performed with the dot image data stored in said print image buffer, with a raster scanned number representative of a number of raster scans actually performed by said print means, said error detection means producing an error signal indicative of an occurrence of a print overrun when the raster scanned number is larger than the raster scanable number and when a difference between the raster scanable number and the raster scanned number is smaller than a predetermined value;

load calculating means, operable when the error signal is produced from said error detection means, for calculating the data processing load of the compressed print data;

threshold value storage means for storing a threshold value to be compared with the data processing load calculated by said load calculating means;

determination means for determining whether or not the data processing load is greater than the threshold value;

threshold value changing means for reducing the threshold value when all of the data processing load of the compressed print data stored in the plurality of bands are smaller than the threshold value but larger than an auxiliary threshold value smaller than the threshold value, the threshold value stored in said threshold value storage means being reduced depending on a difference between the data processing load and the auxiliary threshold value, and wherein the threshold value in said threshold value storage means is updated when the threshold value is reduced by said threshold value changing means; and buffer expansion means for expanding, when the error signal is produced from said error detection means, the storage capacity of said print image buffer to a degree determined according to a difference between the data processing load calculated by said load calculation means and an updated threshold value, whereby after occurrence of the print overrun, subsequent occurrences of the print overruns can effectively be prevented.

13. A printer according to claim 12, wherein calculation of the data processing load by said load calculating means and determination by said determination means are performed with respect to the compressed print data stored in each of said plurality of bands.

14. A printer according to claim 12, wherein said intermediate buffer has a storage capacity variable depending on the compressed print data received from said external source, and wherein said intermediate buffer and said print image buffer share a memory space having a fixed capacity.

* * * * *